United States Patent
Dong et al.

(10) Patent No.: US 10,242,422 B2
(45) Date of Patent: Mar. 26, 2019

(54) COMPUTING METHODS AND APPARATUSES WITH GRAPHICS AND SYSTEM MEMORY CONFLICT CHECK

(71) Applicant: Intel Corporation, Santa Clara, CA (US)

(72) Inventors: Yao Zu Dong, Shanghai (CN); Zhi Wang, Beijing (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/553,143

(22) PCT Filed: Mar. 26, 2015

(86) PCT No.: PCT/CN2015/075116
§ 371 (c)(1),
(2) Date: Aug. 23, 2017

(87) PCT Pub. No.: WO2016/149935
PCT Pub. Date: Sep. 29, 2016

(65) Prior Publication Data
US 2018/0122039 A1 May 3, 2018

(51) Int. Cl.
*G06T 1/20* (2006.01)
*G06F 8/41* (2018.01)
*G06F 9/48* (2006.01)
*G06F 9/455* (2018.01)
(Continued)

(52) U.S. Cl.
CPC ............. *G06T 1/20* (2013.01); *G06F 8/427* (2013.01); *G06F 8/44* (2013.01); *G06F 9/45512* (2013.01);
(Continued)

(58) Field of Classification Search
CPC . G06T 1/20; G06T 15/005; G06T 1/60; G06F 8/427; G06F 8/44; G06F 9/45512;
(Continued)

(56) References Cited

U.S. PATENT DOCUMENTS

| 9,672,583 B2 * | 6/2017 | Lin ..................... G06F 12/1027 |
| 2003/0061459 A1 * | 3/2003 | Aboulenein ........ G06F 12/0215 711/167 |

(Continued)

FOREIGN PATENT DOCUMENTS

| CN | 101088078 A | 12/2007 | |
| WO | WO2008/005722 A1 | 1/2008 | |
| WO | WO 2013/091185 A1 * | 6/2013 | ............. G06F 12/10 |

OTHER PUBLICATIONS

International Search Report and Written Opinion dated Jan. 12, 2016 for International Application No. PCT/CN2015/075116, 11 pages.

(Continued)

*Primary Examiner* — Maurice L. McDowell, Jr.
*Assistant Examiner* — Donna J. Ricks
(74) *Attorney, Agent, or Firm* — Schwabe, Williamson & Wyatt, P.C.

(57) ABSTRACT

An apparatus may include a graphics processing unit (GPU) and a hypervisor. The hypervisor may include a command parser to parse graphics memory addresses associated with a workload of a virtual machine of the apparatus, and generate a first shadow global graphics translation table (SGGT) for translating the graphics memory addresses. The hypervisor may further include a GPU scheduler to check conflict between the first SGGTT and a second SGGTT containing graphics memory addresses used by working sets being-executed or to-be-executed by the render engines of the GPU, and schedule the workload of the virtual machine to a render engine when there is no conflict between the first SGGTT and the second SGGTT. Other embodiments may be described and/or claimed.

24 Claims, 4 Drawing Sheets

(51) Int. Cl.
*G06F 12/1009* (2016.01)
*G06F 12/1027* (2016.01)
*G06T 1/60* (2006.01)
*G06T 15/00* (2011.01)

(52) U.S. Cl.
CPC ........ *G06F 9/45558* (2013.01); *G06F 9/4843* (2013.01); *G06F 9/4881* (2013.01); *G06F 12/1009* (2013.01); *G06F 12/1027* (2013.01); *G06T 1/60* (2013.01); *G06T 15/005* (2013.01); *G06F 2009/45583* (2013.01); *G06F 2212/302* (2013.01); *G06F 2212/657* (2013.01)

(58) Field of Classification Search
CPC .. G06F 9/45558; G06F 9/4881; G06F 9/4843; G06F 2009/45583; G06F 12/1009; G06F 12/1027; G06F 2212/657; G06F 2212/302
See application file for complete search history.

(56) References Cited

U.S. PATENT DOCUMENTS

| | | | |
|---|---|---|---|
| 2006/0139360 A1* | 6/2006 | Panesar | G06F 12/1081 345/568 |
| 2007/0057957 A1* | 3/2007 | Wooten | G06F 12/1009 345/566 |
| 2014/0354667 A1 | 12/2014 | Lin et al. | |
| 2015/0356029 A1* | 12/2015 | Craske | G06F 12/1441 711/163 |
| 2016/0246730 A1* | 8/2016 | Gandhi | G06F 12/1009 |

OTHER PUBLICATIONS

Extended European Search Report dated Nov. 6, 2018 for European Patent Application No. 15885874.6, 8 pages.

* cited by examiner

COMPUTING METHODS AND APPARATUSES WITH GRAPHICS AND SYSTEM MEMORY CONFLICT CHECK

CROSS REFERENCE TO RELATED APPLICATIONS

The present application is a national phase entry under 35 U.S.C. § 371 of International Application No. PCT/CN2015/075116, filed Mar. 26, 2015, entitled "COMPUTING METHODS AND APPARATUSES WITH GRAPHICS AND SYSTEM MEMORY CONFLICT CHECK", which designated, among the various States, the United States of America. The Specification of the PCT/CN2015/075116 Application is hereby fully incorporated by reference.

FIELD OF THE INVENTION

The present disclosure relates generally to the technical field of computing, and more particularly, to apparatuses and methods for managing graphics memory overcommitment in graphics processing unit (GPU) virtualization.

BACKGROUND

Memory overcommitment is a hypervisor feature that may allow virtual machines (VMs) to use more memory space than the physical memory at the physical host. Thus, memory overcommitment may improve the utilization of physical memory and allow more VMs running on a physical host with a limited amount of system memory. For example, if a physical host only has a 4 gigabyte (GB) memory, then only 4 VMs may be supported under a static partition scheme without memory overcommitment if each VM is to be allocated with 1 GB memory.

The background description provided herein is for generally presenting the context of the disclosure. Unless otherwise indicated herein, the materials described in this section are not prior art to the claims in this application and are not admitted to be prior art or suggestions of the prior art by inclusion in this section

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
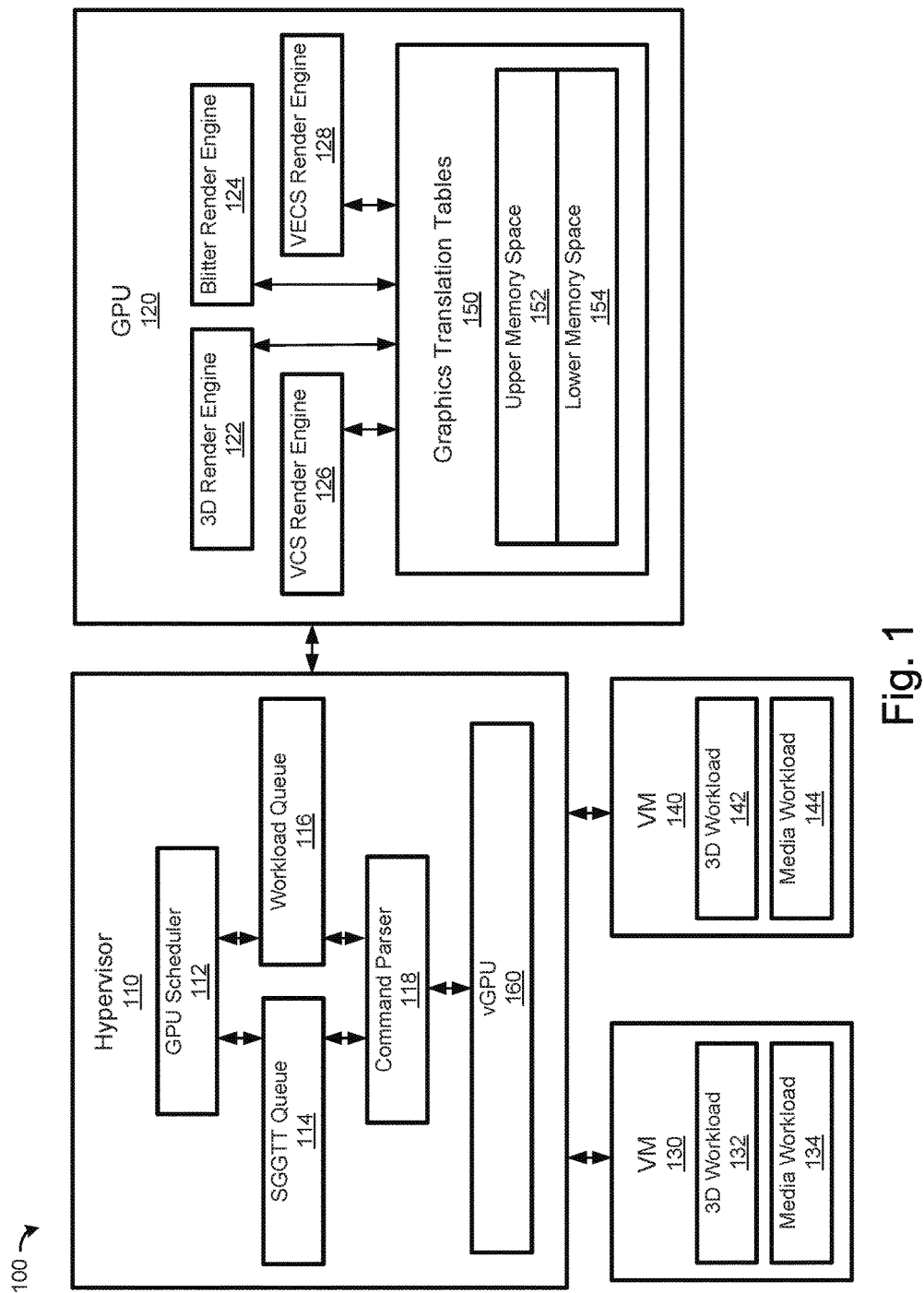
FIG. 1 is a schematic diagram illustrating an example apparatus enabled for graphics memory overcommitment in GPU virtualization, incorporating aspects of the present disclosure for managing the overcommitment, in accordance with various embodiments.

Embodiments of apparatuses and methods for managing graphics memory overcommitment in GPU virtualization are described. In some embodiments, an apparatus may include a graphics processing unit (GPU) and a hypervisor. The hypervisor may include a command parser to parse graphics memory addresses associated with a workload of a virtual machine of the apparatus, and generate a first shadow global graphics translation table (SGGTT) for translating the graphics memory addresses. The hypervisor may further include a GPU scheduler to check conflict between the first SGGTT and a second SGGTT containing graphics memory addresses used by working sets being-executed or to-be-executed by the render engines of the GPU, and schedule the workload of the virtual machine to a render engine when there is no conflict between the first SGGTT and the second SGGTT. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter.

However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in another embodiment," "in some embodiments," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "engine" or "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine or a module may be implemented in firmware, hardware, software, or any combination of firmware, hardware, and software.

Referring now to FIG. 1, an example apparatus 100 enabled for graphics memory overcommitment in GPU virtualization, in accordance with various embodiments, is illustrated. In various embodiments, apparatus 100 may include multiple VMs, e.g., VM 130 and VM 140, managed by hypervisor 110, including access to a full array of GPU features in GPU 120.

In various embodiments, hypervisor 110 may enable VM 130 or VM 140 to utilize graphics memory overcommitment in GPU virtualization. A virtual GPU (vGPU), e.g., vGPU 160, may access the full functionality provided by GPU hardware, e.g., GPU 120 based on the GPU virtualization technology. In various embodiments, hypervisor 110 may track, manage resources and lifecycles of one or more vGPUs. Although only vGPU 160 is shown in FIG. 1, hypervisor 110 may include other vGPUs. In some embodiments, vGPU 160 may include virtual GPU devices presented to VMs and may be used to interactive with native GPU drivers. VM 130 or VM 140 may then access the full array of GPU features and use virtual GPU devices in vGPU 160 to access virtual graphics processors. For instance, once VM 130 is trapped into hypervisor 110, hypervisor 110 may manipulate a vGPU instance, e.g., vGPU 160, and determine whether VM 130 may access virtual GPU devices in vGPU 160. The vGPU context may be switched per quantum or event. In some embodiments, the context switch may happen per GPU render engine, e.g., 3D render engine 122 or blitter render engine 124. The periodic switching allows multiple VMs to share a physical GPU in a manner that is transparent to the workloads of the VMs.

GPU virtualization may take various forms. In some embodiments, VM 130 may be enabled with device passthrough, which is a virtualization model where the entire GPU 120 is presented to VM 130 as if they are directly connected. Much like a single central processing unit (CPU) core may be assigned for exclusive use by VM 130, GPU 120 may also be assigned for exclusive use by VM 130, e.g., even for a limited time. Another virtualization model is timesharing, where GPU 120 or portions of it may be shared by multiple VMs, e.g., VM 130 and VM 140, in a fashion of multiplexing. Other GPU virtualization models may also be used by apparatus 100 in other embodiments. In various embodiments, graphics memory associated with GPU 120 may be partitioned, and allotted to various vGPUs in hypervisor 110.

In various embodiments, graphics translation tables (GTTs) may be used by VMs or GPU 120 to map graphics processor memory to system memory or to translate GPU virtual addresses to physical addresses. In some embodiments, hypervisor 110 may manage graphics memory mapping via shadow GTTs, and the shadow GTTs may be held in a vGPU instance, e.g., vGPU 160. In various embodiments, each VM may have a corresponding shadow GTT to hold the mapping between graphics memory addresses and physical memory addresses, e.g., machine memory addresses under virtualization environment. In some embodiments, the shadow GTT may be shared and maintain the mappings for multiple VMs. In some embodiments, each VM, VM 130 or VM 140, may include both per-process and global GTTs.

In some embodiments, apparatus 100 may use system memory as graphics memory. System memory may be mapped into multiple virtual address spaces by GPU page tables. Apparatus 100 may support global graphics memory space and per-process graphics memory address space. The global graphics memory space may be a virtual address space, e.g., 2 GB, mapped through a global graphics translation table (GGTT). The lower portion of this address space is called aperture, accessible from both GPU 120 and CPU (not shown). The upper portion of this address space is called high graphics memory space or hidden graphics memory space, which may be used by GPU 120 only. In various embodiments, shadow global graphics translation tables (SGGTTs) may be used by VM 130, VM 140, hypervisor 110, or GPU 120 for translating graphics memory addresses to respective system memory addresses based on a global memory address space.

In full GPU virtualization, a static global graphics memory space partitioning scheme may face a scalability problem. For example, for a global graphics memory space of 2 GB, the first 512 megabyte (MB) virtual address space may be reserved for aperture, and the rest of them, 1536 MB, may become the high (hidden) graphics memory space. With the static global graphics memory space partitioning scheme, each VM with full GPU virtualization enabled may be allotted with 128 MB aperture and 384 MB high graphics memory space. Therefore, the 2 GB global graphics memory space may only accommodate a maximum of four VMs.

Besides the scalability problem, VMs with limited graphics memory space may also suffer performance degradation. Sometimes, severe performance downgrade may be observed in some media-heavy workloads of a media application when it uses GPU media hardware acceleration extensively. As an example, to decode one channel 1080p H.264/Advanced Video Coding (AVC) bit stream, at least 40 MB of graphics memory may be needed. Thus, for 10 channels of 1080p H264/AVC bit stream decoding, at least 400 MB of graphics memory space may be needed. Meanwhile, some graphic memory space may have to be set aside for surface composition/color conversion, switching display frame buffer during the decoding process, etc. In this case, 512 MB of graphics memory space per VM may be insufficient for a VM to run multiple video encoding or decoding.

In various embodiments, apparatus 100 may achieve GPU graphics memory overcommitment with on-demand SGGTs. In some embodiments, hypervisor 110 may construct SGGTTs on demand, which may include all the to-be-used translations for graphics memory virtual addresses from different GPU components' owner VMs.

In various embodiments, at least one VM managed by hypervisor 110 may be allotted with more than static partitioned global graphics memory address space as well as memory. In some embodiments, at least one VM managed by hypervisor 110 may be allotted with or able to access the entire high graphics memory address space. In some embodiments, at least one VM managed by hypervisor 110 may be allotted with or able to access the entire graphics memory address space.

Hypervisor 110 may use command parser 118 to detect the potential memory working set of a GPU rendering engine for the commands submitted by VM 130 or VM 140. In various embodiments, VM 130 may have respective command buffers (not shown) to hold commands from 3D workload 132 or media workload 134. Similarly, VM 140 may have respective command buffers (not shown) to hold commands from 3D workload 142 or media workload 144. In other embodiments, VM 130 or VM 140 may have other types of graphics workloads.

In various embodiments, command parser 118 may scan a command from a VM and determine if the command contains memory operands. If yes, the command parser may read the related graphics memory space mappings, e.g., from a GTT for the VM, and then write it into a workload specific portion of the SGGTT. After the whole command buffer of a workload gets scanned, the SGGTT that holds memory address space mappings associated with this workload may be generated or updated. Additionally, by scanning the to-be-executed commands from VM 130 or VM 140, command parser 118 may also improve the security of GPU operations, such as by mitigating malicious operations.

In some embodiments, one SGGTT may be generated to hold translations for all workloads from all VMs. In some embodiments, one SGGTT may be generated to hold translations for all workloads, e.g., from one VM only. The workload specific SGGTT portion may be constructed on demand by command parser 118 to hold the translations for a specific workload. e.g., 3D workload 132 from VM 130 or media workload 144 from VM 140. In some embodiments, command parser 118 may insert the SGGTT into SGGTT queue 114 and insert the corresponding workload into workload queue 116.

In some embodiments. GPU scheduler 112 may construct such on-demand SGGTT at the time of execution. A specific hardware engine may only use a small portion of the graphics memory address space allocated to VM 130 at the time of execution, and the GPU context switch happens infrequently. To take advantage of such GPU features, hypervisor 110 may use the SGGTT for VM 130 to only hold the in-execution and to-be-executed translations for various GPU components rather than the entire portion of the global graphics memory address space allotted to VM 130.

GPU scheduler 112 for GPU 120 may be separated from the scheduler for CPU in apparatus 100. To take the advantage of the hardware parallelism in some embodiments, GPU scheduler 112 may schedule the workloads separately for different GPU engines, e.g., 3D render engine 122, blitter render engine 124, video command streamer (VCS) render engine 126, and video enhanced command streamer (VECS) render engine 128. For example, VM 130 may be 3D intensive, and 3D workload 132 may need to be scheduled to 3D render engine 122 at a moment. Meanwhile. VM 140 may be media intensive, and media workload 144 may need to be scheduled to VCS render engine 126 and/or VECS render engine 128. In this case, GPU scheduler 112 may schedule 3D workload 132 from VM 130 and media workload 144 from VM 140 separately.

In various embodiments, GPU scheduler 112 may track in-executing SGGTTs used by respective render engines in GPU 120. In this case, hypervisor 110 may retain a per-render engine SGGTT for tracking all in-executing graphic memory working sets in respective render engines. In some embodiments, hypervisor 110 may retain a single SGGTT for tracking all in-executing graphic memory working sets for all render engines. In some embodiments, such tracking may be based on a separate in-executing SGGTT queue (not shown). In some embodiments, such tracking may be based on markings on SGGTT queue 114, e.g., using a registry. In some embodiments, such tracking may be based on markings on workload queue 116, e.g., using a registry.

During the scheduling process, GPU scheduler 112 may examine the SGGTT from SGGTT queue 114 for a to-be-scheduled workload from workload queue 116. In some embodiments, to schedule the next VM for a particular render engine. GPU scheduler 112 may check whether the graphic memory working sets of the particular workload used by the VM for that render engine conflict with the in-executing or to-be-executed graphic memory working sets by that render engine. In other embodiments, such conflict checks may extend to check with the in-executing or to-be-executed graphic memory working sets by all other render engines. In various embodiments, such conflict checks may be based on the corresponding SGGTTs in SGGTT queue 114 or based on SGGTTs retained by hypervisor 110 for tracking all in-executing graphic memory working sets in respective render engines as discussed hereinbefore.

If there is no conflict, GPU scheduler 112 may integrate the in-executing and to-be-executed graphic memory working sets together. In some embodiments, a resulting SGGTT for the in-executing and to-be-executed graphic memory working sets for the particular render engine may also be generated and stored, e.g., in SGGTT queue 114 or in other data storage means. In some embodiments, a resulting SGGTT for the in-executing and to-be-executed graphic memory working sets for all render engines associated with one VM may also be generated and stored if the graphics memory addresses of all these workloads do not conflict with each other.

Before submitting a selected VM workload to GPU 120, hypervisor 110 may write corresponding SGGTT pages into GPU 120, e.g., to graphics translation tables 150. Thus, hypervisor 110 may enable this workload to be executed with correct mappings in the global graphics memory space. In various embodiments, all such translation entries may be written into graphics translation tables 150, either to lower memory space 154 or upper memory space 152. Graphics translation tables 150 may contain separate tables per VM to hold for these translation entries in some embodiments. Graphics translation tables 150 may also contain separate tables per render engine to hold for these translation entries in other embodiments. In various embodiments, graphics translation tables 150 may contain, at least, to-be-executed graphics memory addresses.

However, if there is a conflict determined by GPU scheduler 112, GPU scheduler 112 may then defer the schedule-in of that VM, and try to schedule-in another workload of the same or a different VM instead. In some embodiments, such conflict may be detected if two or more VMs may attempt to use a same graphics memory address, e.g., for a same render engine or two different render engines. In some embodiments, GPU scheduler 112 may change the scheduler policy to avoid selecting one or more of the rendering engines, which have the potential to conflict with each other. In some embodiments, GPU scheduler 112 may suspend the execution hardware engine to mitigate the conflict.

In some embodiments, memory overcommitment scheme in GPU virtualization as discussed herein may co-exist with static global graphics memory space partitioning schemes. As an example, the aperture in lower memory space 154 may still be used for static partition among all VMs. The high graphics memory space in upper memory space 152 may be used for the memory overcommitment scheme. Compared to the static global graphics memory space partitioning scheme, memory overcommit scheme in GPU virtualization may enable each VM to use the entire high graphics memory space in upper memory space 152, which may allow some applications inside each VM to use greater graphic memory space for improved performance.

With static global graphics memory space partitioning schemes, a VM initially claiming a large portion of memory may only use a small portion at runtime, while other VMs may be in the status of shortage of memory. With memory overcommitment, a hypervisor may allocate memory for VMs on demand, and the saved memory may be used to support more VMs. With SGGTT based memory overcommitment, only graphic memory space used by the to-be-executed workloads may be allocated at runtime, which saves graphics memory space and supports more VMs to access GPU 120.

Figure 2:
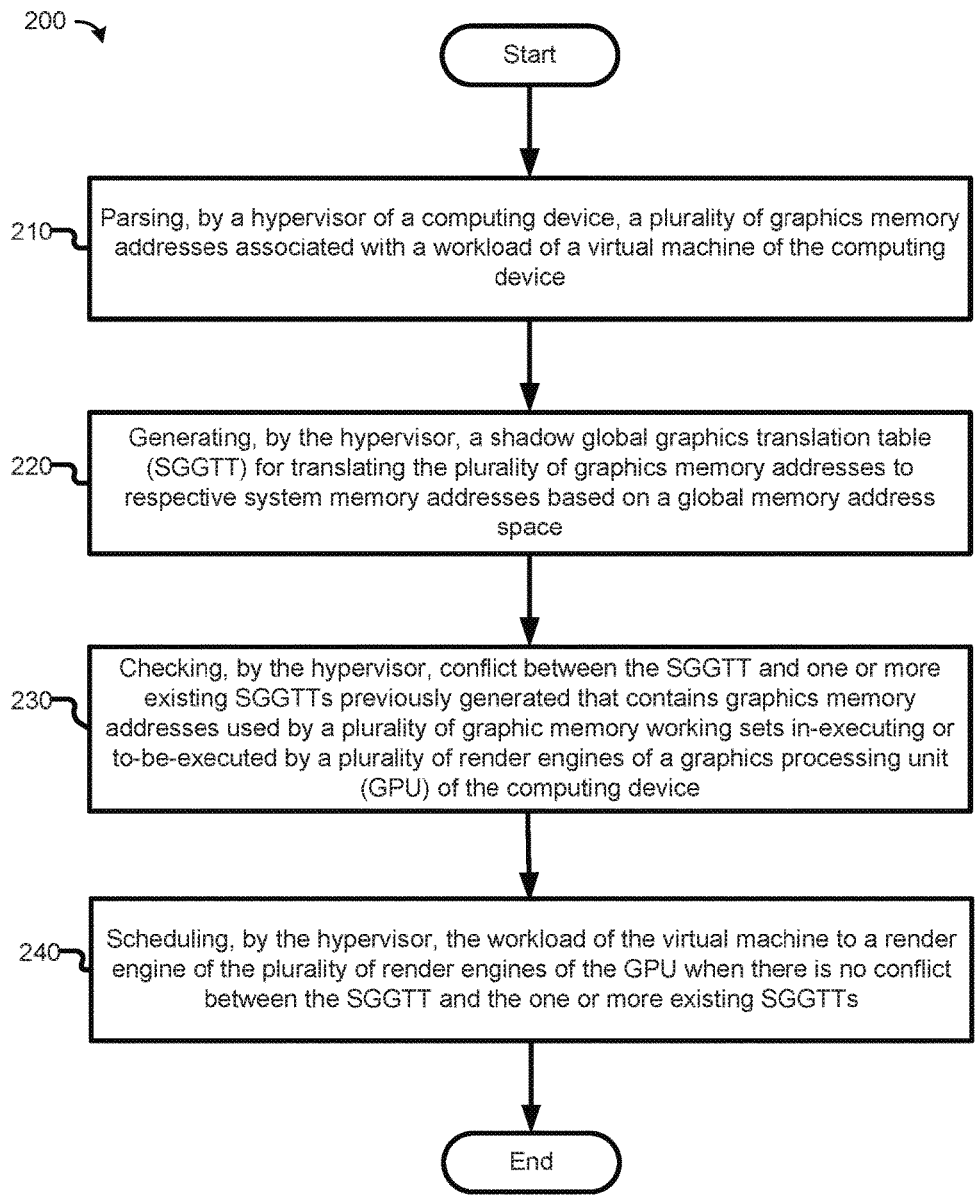
FIG. 2 is a flow diagram of an example process for managing graphics memory overcommitment in GPU virtualization, which may be practiced by an example apparatus, incorporating aspects of the present disclosure, in accordance with various embodiments.

Referring now to FIG. 2, it is a flow diagram of an example process 200 for managing graphics memory overcommitment in GPU virtualization, which may be practiced by an example device in accordance with various embodiments. The process 200 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for facilitating management of graphics memory overcommitment in GPU virtualization. As such, process 200 may be performed by a computing device, e.g., apparatus 100 of FIG. 1, to implement one or more embodiments of the present disclosure. In embodiments, various blocks in FIG. 2 may be combined or arranged in any suitable order, e.g., according to the particular embodiment of hypervisor 110 of FIG. 1.

In embodiments, the process may begin at block 210, where a hypervisor of a computing device, e.g., hypervisor 110 of FIG. 1, may parse a plurality of graphics memory addresses associated with a workload of a virtual machine of the computing device. In some embodiments, the hypervisor may scan a plurality of command buffers in the virtual machine for those commands of the workload associated with respective render engines of the GPU. Through scanning the commands in the command buffers, the hypervisor may determine the graphics memory working sets, and accordingly determine the graphics memory addresses of respective graphics memory working sets for a VM. As an example, command parser 118 of hypervisor 110 may scan the whole command buffers corresponding to each rendering engine in GPU 120 before a workload from VM 130 may be submitted to GPU 120. During the scanning process, command parser 118 may determine which graphics memory addresses are used by a specific workload. e.g., 3D workload 132 or media workload 134. Graphics memory addresses parsed out in this process may be used in block 220 to generate an SGGTT to contain the translation for these addresses to system memory addresses.

In various embodiments, different types of graphics memory access methods for GPU commands may be encountered by a hypervisor. Some GPU commands are direct access type, where graphics memory space addresses may be directly translated via entries on the GPU page table. Some GPU commands are indirect access type, where indirect memory addresses with indirect states may be used. There are many indirect states. Each indirect state may indicate a region of graphics memory space via assigning a lower bound and an upper bound. An indirect address may include the offset inside a region managed by an indirect state. As an example, shaders and many instructions related to fixed functions may use such indirect memory access methods.

In various embodiments, the hypervisor, e.g., a command parser of the hypervisor, may parse the plurality of graphics memory addresses from a plurality of commands for direct memory access or a plurality of commands for indirect memory access associated with the workload. During command scan, a command parser may figure out the associated graphics memory space regions from the operands of a GPU command. As an example, for a MI_SET_CONTEXT instruction, the command parser may scan the beginning of graphics memory space addresses from operands of a command, and then get the actual context size from context size register, e.g., CTX_SIZE, offset 0x21a8. As another example, for indirect access, the command parser may determine indirect states regions from the operands of an indirect state setup instruction, e.g., STATE_BASE_ADDRESS, DWORD0, or DWORD12, which may denote the region of graphics memory space for a general indirect state.

Next, at block 220, the hypervisor may generate a shadow global graphics translation table (SGGTT) for translating the plurality of graphics memory addresses to respective system memory addresses based on a global memory address space. In various embodiments, a command parser of the hypervisor may scan an instruction and determine if this instruction contains memory operands. If yes, the command parser may read the related graphics memory space mappings, e.g., from per-VM global shadow GGTT, and then write it into the SGGTT. After the whole command buffer of a workload gets scanned, a smart SGGTT that holds memory space mappings associated with this workload may also be generated. Therefore, in some embodiments, the SGGTT may be generated for translating the plurality of graphics memory addresses to the system memory addresses for a plurality of commands in an entire command buffer associated with the workload.

In some embodiments, the SGGTT generated for the workload for translating the plurality of graphics memory addresses to the system memory addresses may be associated with only a particular render engine in the GPU. As an example, a workload in a VM may be associated with a particular render engine in the GPU, e.g., a 3D render engine. In this case, the generated SGGTT likewise may be associated with the 3D render engine only.

In various embodiments, the SGGTTs may be allowed to access a portion of the global graphics memory address space at least greater than a memory address space would have allocated to the VM based on a static global graphics memory space partitioning scheme. Compared to static global graphics memory space partitioning schemes, memory overcommit schemes based on SGGTTs in GPU virtualization as discussed herein may enable each VM to use the entire high graphics memory address space in some embodiments, or even the entire global graphics memory address space in other embodiments. In some embodiments, the high graphics memory space may occupy the upper portion of the global graphics memory address space, while the aperture may occupy the lower portion of the global graphics memory address space.

Some applications inside a VM may leverage from the increased graphic memory address space for improved performance. In some embodiments, with SGGTTs, only graphic memory address space used by the to-be-executed workload may be allocated at runtime, which preserves the high graphics memory address space and increases the maximum number of VMs supported by the host. Further, it may also improve the utilization of GPU hardware resources in a full GPU virtualization environment.

Next, at block 230, the hypervisor, e.g., via a GPU scheduler of the hypervisor, may check conflict between the SGGTT and one or more existing SGGTTs previously generated that contains graphics memory addresses used by graphic memory working sets in-executing or to-be-executed by one or more render engines of a GPU of the computing device. In various embodiments, the GPU scheduler may check the conflict based at least in part on whether the SGGTT and the existing one or more SGGTTs have a same entry (e.g., a same graphics memory address) in the global graphics memory address space. In some embodiments, the existing one or more SGGTTs may be based on respective render engines. As an example, each render engine may have a corresponding SGGTT for conflict checking. In some embodiments, the existing one or more SGGTTs may be integrated as one SGGTT for the GPU.

In some embodiments, the GPU scheduler may integrate the newly generated SGGTT into the one or more existing SGGTTs when there is no conflict between the SGGTT and the one or more existing SGGTs. However, when there is a conflict between the newly generated SGGTT and the one or more existing SGGTTs, the GPU scheduler may defer such integration. In turn, the GPU scheduler may attempt to schedule the next workload in the queue to the GPU.

Next, at block 240, the hypervisor, e.g., via the GPU scheduler of the hypervisor, may schedule the workload of the virtual machine to a render engine of the plurality of render engines of the GPU when there is no conflict between the SGGTT and the one or more existing SGGTTs. In some embodiments, the GPU scheduler may write the integrated SGGTT to the GPU and then submit the workload of the virtual machine to the appropriate render engine.

Figure 3:
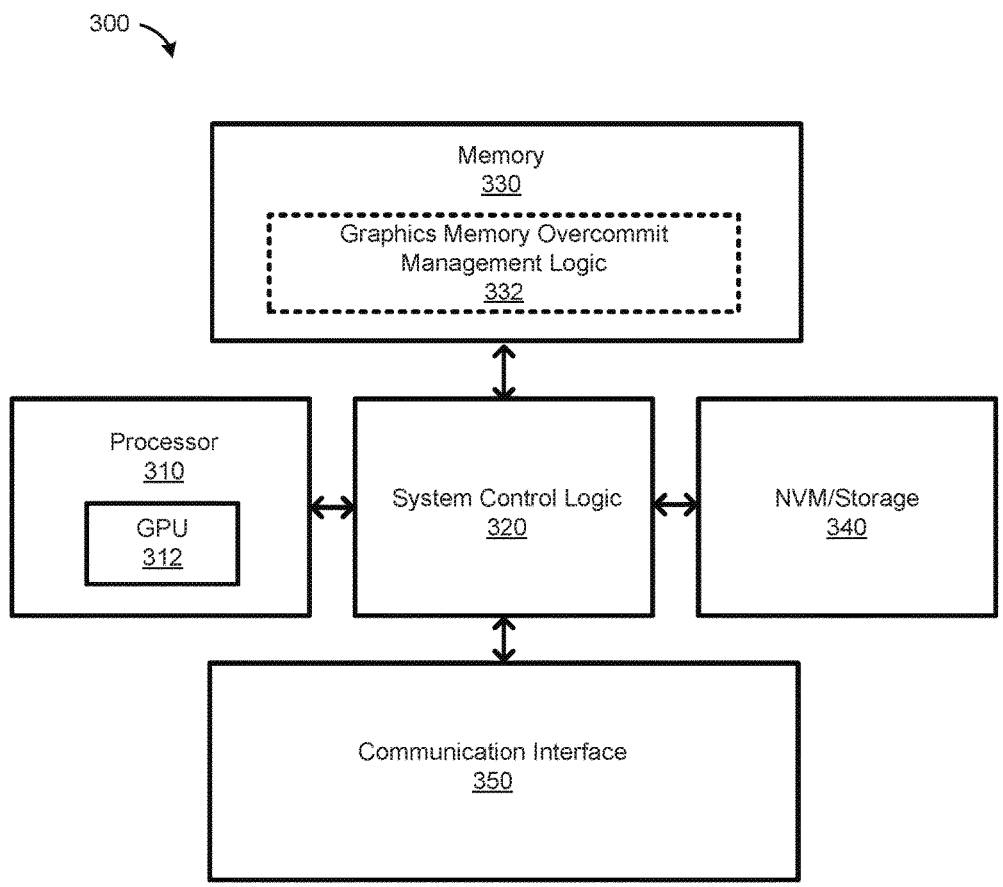
FIG. 3 illustrates an example computing device suitable for practicing the present disclosure, in accordance with various embodiments.

FIG. 3 illustrates an embodiment of a computing device 300 suitable for practicing embodiments of the present disclosure. Computing device 300 may be any computing device that has a GPU, in forms such as a smartphone, a tablet, a laptop, a wearable device, a server, etc. As illustrated, computing device 300 may include system control logic 320 coupled to processor 310, to system memory 330, to non-volatile memory (NVM)/storage 340, and to communication interface 350. In various embodiments, processor 310 may include GPU 312 and one or more processor cores.

In embodiments, communication interface 350 may provide an interface for computing device 300 to communicate over one or more network(s) and/or with any other suitable device. Communication interface 350 may include any suitable hardware and/or firmware, such as a network adapter, a network interface card, one or more antennas, wireless interface(s), and so forth. In various embodiments, communication interface 350 may include an interface for computing device 300 to use radio-frequency identification (RFID), near field communication (NFC), optical communications, or other similar technologies to communicate directly (e.g., without an intermediary) with another device. In various embodiments, communication interface 350 may interoperate with radio communications technologies such as, for example, Wideband Code Division Multiple Access (WCDMA), Global System for Mobile Communications (GSM), Long Term Evolution (LTE), Bluetooth, Zigbee, and the like.

In some embodiments, system control logic 320 may include any suitable interface controllers to provide for any suitable interface to the processor 310 and/or to any suitable device or component in communication with system control logic 320. System control logic 320 may also interoperate with a display (not shown) for the display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 320 may include one or more memory controller(s) (not shown) to provide an interface to system memory 330. System memory 330 may be used to load and store data and/or instructions, for example, for computing device 300. System memory 330 may include any suitable volatile memory, such as dynamic random access memory (DRAM), for example.

In some embodiments, memory 330 may include, in particular, the logic for managing graphics memory overcommitment in GPU virtualization as earlier described, collectively denoted as graphics memory overcommit management logic 332. In embodiments, graphics memory overcommit management logic 332 may include instructions that, when executed by processor 310, result in computing device 300 performing various functions associated with VM 130 or 140, hypervisor 110, and/or GPU 120 in connection with FIG. 1. Graphics memory overcommit management logic 332 may include instructions that, when executed by processor 310, result in computing device 300 providing graphics memory overcommitment in GPU virtualization, such as, but not limited to, process 200.

In some embodiments, system control logic 320 may include one or more input/output (I/O) controller(s) (not shown) to provide an interface to NVM/storage 340 and communication interface 350. NVM/storage 340 may be used to store data and/or instructions, for example. NVM/storage 340 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 340 may include a storage resource that is physically part of a device on which computing device 300 is installed or it may be accessible by, but not necessarily a part of, computing device 300. For example, NVM/storage 340 may be accessed by computing device 300 over a network via communication interface 350.

In some embodiments, processor 310 may be packaged together with memory having system control logic 320 and/or logic of graphics memory overcommit management logic 332. In some embodiments, at least one of the processor(s) 310 may be packaged together with memory having system control logic 320 and/or logic of graphics memory overcommit management logic 332 to form a System in Package (SiP). In some embodiments, processor 310 may be integrated on the same die with memory having system control logic 320 and/or logic of graphics memory overcommit management logic 332. In some embodiments, processor 310 may be integrated on the same die with memory having system control logic 320 and/or graphics memory overcommit management logic 332 to form a System on Chip (SoC).

Figure 4:
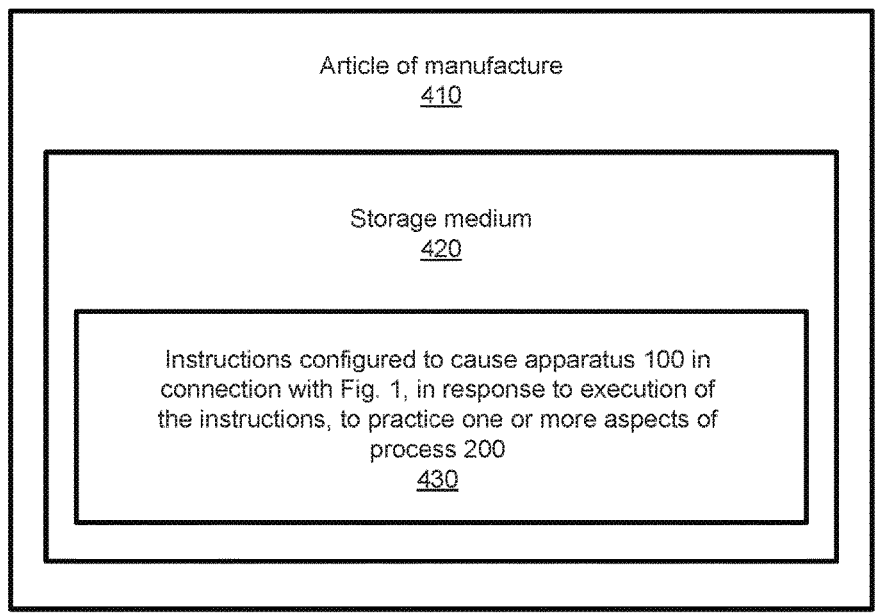
FIG. 4 illustrates an article of manufacture having programming instructions, incorporating aspects of the present disclosure, in accordance with various embodiments.

FIG. 4 illustrates an article of manufacture 410 having programming instructions, incorporating aspects of the present disclosure, in accordance with various embodiments. In various embodiments, an article of manufacture may be employed to implement various embodiments of the present disclosure. As shown, the article of manufacture 410 may include a computer-readable non-transitory storage medium 420 where instructions 430 are configured to practice embodiments of or aspects of embodiments of any one of the processes described herein. The storage medium 420 may represent a broad range of persistent storage media known in the art, including but not limited to flash memory, dynamic random access memory, static random access memory, an optical disk, a magnetic disk, etc. Instructions 430 may enable an apparatus, in response to their execution by the apparatus, to perform various operations described herein. As an example, storage medium 420 may include instructions 430 configured to cause an apparatus, e.g., apparatus 100, to practice some aspects of graphics memory overcommitment management in GPU virtualization, as illustrated in process 200 of FIG. 2, in accordance with embodiments of the present disclosure. In embodiments, computer-readable storage medium 420 may include one or more computer-readable non-transitory storage media. In other embodiments, computer-readable storage medium 420 may be transitory, such as signals, encoded with instructions 430.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

Example 1 is an apparatus for computing, which may include one or more processors including a graphics processing unit (GPU); and a hypervisor coupled to the GPU. The hypervisor may include a command parser to parse a plurality of graphics memory addresses associated with a workload of a virtual machine of the apparatus, and generate a first shadow global graphics translation table (SGGTT) for translating the plurality of graphics memory addresses to respective system memory addresses of the apparatus based on a portion of a global memory address space accessible to the virtual machine. The hypervisor may further include a GPU scheduler to check conflict between the first SGGTT and a second SGGTT containing graphics memory addresses used by a plurality of graphic memory working sets being-executed or to-be-executed by a plurality of render engines of the GPU, and schedule the workload of the virtual machine to a render engine of the plurality of render engines of the GPU when there is no conflict between the first SGGTT and the second SGGTT.

Example 2 may include the subject matter of Example 1, and may further specify that the GPU scheduler may further integrate the first SGGTT into the second SGGTT, write a plurality of address mappings of the integrated SGGTT to the GPU, and submit the workload of the virtual machine to the render engine of the plurality of render engines of the GPU, in response to no conflict between the first SGGTT and the second SGGTT.

Example 3 may include the subject matter of Example 1 or 2, and may further specify that the hypervisor further includes a workload queue to hold a plurality of workloads from one or more virtual machines of the apparatus, and an SGGTT queue to hold a plurality of SGGTTs corresponding to the plurality of workloads.

Example 4 may include the subject matter of Example 3, and may further specify that the GPU scheduler is further to defer the workload of the virtual machine, and to schedule another workload from the workload queue that a respective SGGTT of the another workload does not conflict with the second SGGT, in response to a conflict between the first SGGTT and the second SGGTT.

Example 5 may include any subject matter of Examples 1-4, and may further specify that the command parser is further to scan a plurality of command buffers of the apparatus that contains a plurality of commands of the workload for the plurality of graphics memory addresses associated with the plurality of commands.

Example 6 may include any subject matter of Examples 1-5, and may further specify that the command parser is further to parse the plurality of graphics memory addresses from a plurality of commands for direct memory access and a plurality of commands for indirect memory access associated with the workload.

Example 7 may include any subject matter of Examples 1-6, and may further specify that the GPU comprises the plurality of render engines with at least one 3-dimension render engine, at least one blitter render engine, at least one video command streamer (VCS) render engine, and at least one video enhanced command streamer (VECS) render engine.

Example 8 may include the subject matter of Example 7, and may further specify that the workload is for only one of the render engines.

Example 9 may include any subject matter of Examples 1-8, and may further specify that the portion of the global memory address space is greater than a memory space allocated to the virtual machine only based on a static global graphics memory space partitioning scheme.

Example 10 may include any subject matter of Examples 1-9, and may further specify that the portion of the global memory address space includes an entire upper portion of a global graphics memory address space shared by at least another virtual machine of the apparatus.

Example 11 is a method for computing, which may include parsing, by a hypervisor of a computing device, a plurality of graphics memory addresses associated with a workload of a virtual machine of the computing device; generating, by the hypervisor, a shadow global graphics translation table (SGGTT) for translating the plurality of graphics memory addresses to respective system memory addresses based on a global graphics memory address space; checking, by the hypervisor, conflict between the SGGTT and one or more existing SGGTTs previously generated that contains graphics memory addresses used by a plurality of graphic memory working sets in-executing or to-be-executed by a plurality of render engines of a graphics processing unit (GPU) of the computing device; and scheduling, by the hypervisor, the workload of the virtual machine to a render engine of the plurality of render engines of the GPU when there is no conflict between the SGGTT and the one or more existing SGGTTs.

Example 12 may include the subject matter of Example 11, and may further include integrating, by the hypervisor, the SGGTT into the one or more existing SGGTTs when there is no conflict between the SGGTT and the one or more existing SGGTTs; and deferring, by the hypervisor, the integration of the SGGTT into the one or more existing SGGTs and the scheduling of the workload of the virtual machine to the render engine when there is a conflict between the SGGTT and the one or more existing SGGTs.

Example 13 may include the subject matter of Example 11 or 12, and may further specify that parsing further comprises scanning, by the hypervisor, a plurality of command buffers associated with respective render engines of the GPU, the plurality of command buffers containing a plurality of commands of the workload in the virtual machine.

Example 14 may include any subject matter of Examples 11-13, and may further specify that parsing further comprises parsing, by the hypervisor, the plurality of graphics memory addresses from a plurality of commands for direct memory access or a plurality of commands for indirect memory access associated with the workload.

Example 15 may include the subject matter of Examples 11-14, and may further specify that generating further comprises generating, by the hypervisor, the SGGTT for translating the plurality of graphics memory addresses of a plurality of commands in an entire command buffer associated with the workload.

Example 16 may include any subject matter of Examples 11-15, and may further specify that generating further comprises generating, by the hypervisor, the SGGTT for the workload for translating the plurality of graphics memory addresses associated with only a particular render engine in the GPU.

Example 17 may include any subject matter of Examples 11-16, and may further specify that generating further comprises generating, by the hypervisor, the SGGTT based on a portion of the global graphics memory address space accessible to the virtual machine, wherein the portion of the global graphics memory address space is greater than a memory address space accessible to the virtual machine based on a static global graphics memory space partitioning scheme.

Example 18 may include any subject matter of Examples 11-17, and may further specify that generating further comprises generating, by the hypervisor, the SGGTT based on a portion of the global graphics memory address space accessible to the virtual machine, wherein the portion of the global graphics memory address space includes an entire upper portion of the global graphics memory address space shared by at least another virtual machine of the computing device.

Example 19 may include any subject matter of Examples 11-18, and may further specify that checking further comprises checking, by the hypervisor, conflict based at least in part on whether the SGGTT and the existing one or more SGGTTs have a same entry in the global graphics memory address space.

Example 20 may include any subject matter of Examples 11-19, and may further include writing, by the hypervisor, a plurality of address mappings of the SGGTT to a page table in the GPU; and submitting, by the hypervisor, the workload of the virtual machine to the render engine of the plurality of render engines of the GPU.

Example 21 is at least one storage medium, which may include a plurality of instructions configured to cause an apparatus, in response to execution of the instructions by the apparatus, to practice any subject matter of Examples 11-20.

Example 22 is a system for computing, which may include means to practice any subject matter of Examples 11-20.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus for processing data, comprising:
one or more processors including a graphics processing unit (GPU); and
a hypervisor, coupled to the GPU, the hypervisor including:
a command parser to parse a plurality of graphics memory addresses associated with a workload of a virtual machine of the apparatus, and generate a first shadow global graphics translation table (SGGTT) for translating the plurality of graphics memory addresses to respective system memory addresses of the apparatus based on a portion of a global memory address space accessible to the virtual machine; and
a GPU scheduler to check conflict between the first SGGTT and a second SGGTT containing graphics memory addresses used by a plurality of graphic memory working sets being-executed or to-be-executed by a plurality of render engines of the GPU, and schedule the workload of the virtual machine to a render engine of the plurality of render engines of the GPU when there is no conflict between the first SGGTT and the second SGGTT.

2. The apparatus of claim 1, wherein the GPU scheduler is further to integrate the first SGGTT into the second SGGTT, write a plurality of address mappings from the integrated SGGTT to the GPU, and submit the workload of the virtual machine to the render engine of the plurality of render engines of the GPU, in response to no conflict between the first SGGTT and the second SGGTT.

3. The apparatus of claim 1, wherein the hypervisor further comprises a workload queue to hold a plurality of workloads from one or more virtual machines of the apparatus, and an SGGTT queue to hold a plurality of SGGTTs corresponding to the plurality of workloads.

4. The apparatus of claim 3, wherein the GPU scheduler is further to defer the workload of the virtual machine in response to a conflict between the first SGGTT and the second SGGTT, and to schedule another workload from the workload queue when a respective SGGTT of the another workload does not conflict with the second SGGTT.

5. The apparatus of claim 1, wherein the command parser is further to scan a plurality of command buffers of the apparatus that contains a plurality of commands of the workload for the plurality of graphics memory addresses associated with the plurality of commands.

6. The apparatus of claim 1, wherein the command parser is further to parse the plurality of graphics memory addresses from a plurality of commands for direct memory access and a plurality of commands for indirect memory access associated with the workload.

7. The apparatus of claim 1, wherein the GPU comprises the plurality of render engines with at least one 3-dimension render engine, at least one blitter render engine, at least one video command streamer (VCS) render engine, and at least one video enhanced command streamer (VECS) render engine.

8. The apparatus of claim 7, wherein the workload is for only one of the render engines.

9. The apparatus of claim 1, wherein the portion of the global memory address space is greater than a memory space allocated to the virtual machine only based on a static global graphics memory space partitioning scheme.

10. The apparatus of claim 1, wherein the portion of the global memory address space includes an entire upper portion of a global graphics memory address space shared by at least another virtual machine of the apparatus.

11. A method for processing data, comprising:
parsing, by a hypervisor of a computing device, a plurality of graphics memory addresses associated with a workload of a virtual machine of the computing device;
generating, by the hypervisor, a shadow global graphics translation table (SGGTT) for translating the plurality of graphics memory addresses to respective system memory addresses based on a global graphics memory address space;

checking, by the hypervisor, conflict between the SGGTT and one or more existing SGGTTs previously generated that contains graphics memory addresses used by a plurality of graphic memory working sets in-executing or to-be-executed by a plurality of render engines of a graphics processing unit (GPU) of the computing device; and scheduling, by the hypervisor, the workload of the virtual machine to a render engine of the plurality of render engines of the GPU when there is no conflict between the SGGTT and the one or more existing SGGTTs.

12. The method of claim 11, further comprising:
integrating, by the hypervisor, the SGGTT into the one or more existing SGGTTs when there is no conflict between the SGGTT and the one or more existing SGGTTs; and deferring, by the hypervisor, the integration of the SGGTT into the one or more existing SGGTTs and the scheduling of the workload of the virtual machine to the render engine when there is a conflict between the SGGTT and the one or more existing SGGTTs.

13. The method of claim 11, wherein parsing further comprises scanning, by the hypervisor, a plurality of command buffers associated with respective render engines of the GPU, the plurality of command buffers containing a plurality of commands of the workload in the virtual machine.

14. The method of claim 11, wherein parsing further comprises parsing, by the hypervisor, the plurality of graphics memory addresses from a plurality of commands for direct memory access or a plurality of commands for indirect memory access associated with the workload.

15. The method of claim 11, wherein generating further comprises generating, by the hypervisor, the SGGTT for translating the plurality of graphics memory addresses of a plurality of commands in an entire command buffer associated with the workload.

16. The method of claim 11, wherein generating further comprises generating, by the hypervisor, the SGGTT for the workload for translating the plurality of graphics memory addresses associated with only a particular render engine in the GPU.

17. The method of claim 11, wherein generating further comprises generating, by the hypervisor, the SGGTT based on a portion of the global graphics memory address space accessible to the virtual machine, wherein the portion of the global graphics memory address space is greater than a memory address space accessible to the virtual machine based on a static global graphics memory space partitioning scheme.

18. The method of claim 11, wherein generating further comprises generating, by the hypervisor, the SGGTT based on a portion of the global graphics memory address space accessible to the virtual machine, wherein the portion of the global graphics memory address space includes an entire upper portion of the global graphics memory address space shared by at least another virtual machine of the computing device.

19. The method of claim 11, wherein checking further comprises checking, by the hypervisor, conflict based at least in part on whether the SGGTT and the existing one or more SGGTTs have a same entry in the global graphics memory address space.

20. The method of claim 11, further comprising:
writing, by the hypervisor, a plurality of address mappings of the SGGTT to a page table in the GPU; and submitting, by the hypervisor, the workload of the virtual machine to the render engine of the plurality of render engines of the GPU.

21. At least one non-transitory computer readable storage medium having a plurality of instructions configured to enable an apparatus, in response to execution of the plurality of instructions by the apparatus, to:

parse a plurality of graphics memory addresses associated with a workload of a virtual machine of the apparatus;

generate a shadow global graphics translation table (SGGTT) for translating the plurality of graphics memory addresses to respective system memory addresses based on a global graphics memory address space;

check conflict between the SGGTT and one or more existing SGGTTs previously generated that contains graphics memory addresses used by a plurality of graphic memory working sets in-executing or to-be-executed by a plurality of render engines of a graphics processing unit (GPU) of the apparatus; and schedule the workload of the virtual machine to a render engine of the plurality of render engines of the GPU when here is no conflict between the SGGTT and the one or more existing SGGTTs.

22. The storage medium of claim 21, the instructions configured to further cause the apparatus to:
integrate the SGGTT into the one or more existing SGGTTs when there is no conflict between the SGGTT and the one or more existing SGGTTs; and defer the integration of the SGGTT into the one or more existing SGGTTs and the scheduling of the workload of the virtual machine to the render engine when there is a conflict between the SGGTT and the one or more existing SGGTTs.

23. The storage medium of claim 21, the instructions configured to further cause the apparatus to:
generate the SGGTT based on a portion of the global graphics memory address space accessible to the virtual machine, wherein the portion of the global graphics memory address space is greater than a memory address space accessible to the virtual machine based on a static global graphics memory space partitioning scheme.

24. The storage medium of claim 21, the instructions configured to further cause the apparatus to:
generate the SGGTT based on a portion of the global graphics memory address space accessible to the virtual machine, wherein the partition of the global graphics memory address space includes an entire upper portion of the global graphic memory address space shared by at least another virtual machine of the apparatus.

* * * * *

UNITED STATES PATENT AND TRADEMARK OFFICE
CERTIFICATE OF CORRECTION

PATENT NO. : 10,242,422 B2
APPLICATION NO. : 15/553143
DATED : March 26, 2019
INVENTOR(S) : Yao Zu Dong et al.

Page 1 of 1

It is certified that error appears in the above-identified patent and that said Letters Patent is hereby corrected as shown below:

In the Claims

Column 16
Line 32, "...when here..." should read – "...when there..."

Signed and Sealed this
Twenty-first Day of May, 2019

Andrei Iancu
*Director of the United States Patent and Trademark Office*